(12) United States Patent
Campbell et al.

(10) Patent No.: US 8,005,984 B2
(45) Date of Patent: Aug. 23, 2011

(54) FLEXIBLE PROCEDURE FOR QUIESCING MULTIPLEXED CLIENT

(75) Inventors: Mark J. Campbell, Hampshire (GB);
Paul G. Clarke, Hampshire (GB);
Michael Horan, Hampshire (GB);
Shilpashree H. Rangaswamy, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/248,078

(22) Filed: Oct. 9, 2008

(65) Prior Publication Data

US 2010/0095022 A1    Apr. 15, 2010

(51) Int. Cl.
*G06F 15/173* (2006.01)
*G06F 15/16* (2006.01)
*G06F 13/00* (2006.01)

(52) U.S. Cl. .................... 709/238; 709/229; 719/312

(58) Field of Classification Search .............. 719/310, 719/312; 718/1; 709/208, 218, 223–224, 709/230, 237–238, 229
See application file for complete search history.

(56) References Cited

U.S. PATENT DOCUMENTS

| | | | |
|---|---|---|---|
| 5,926,458 A | 7/1999 | Yin | |
| 5,935,215 A | 8/1999 | Bell et al. | |
| 6,189,025 B1 | 2/2001 | Ogura et al. | |
| 6,359,883 B1 | 3/2002 | Lechleider | |
| 7,120,697 B2 | 10/2006 | Aiken, Jr. et al. | |
| 2002/0172175 A1 | 11/2002 | Okamura | |
| 2004/0210890 A1* | 10/2004 | Armstrong et al. | 717/168 |
| 2005/0034014 A1* | 2/2005 | Moser et al. | 714/17 |
| 2005/0286415 A1 | 12/2005 | Guo | |
| 2007/0186212 A1* | 8/2007 | Mazzaferri et al. | 718/1 |

FOREIGN PATENT DOCUMENTS

| | | |
|---|---|---|
| GB | EP 0 733 971 A2 | 9/1996 |
| WO | WO 01/22663 A1 | 3/2001 |
| WO | WO 01/48976 A2 | 7/2001 |

\* cited by examiner

*Primary Examiner* — Peling A Shaw
(74) *Attorney, Agent, or Firm* — Scully, Scott, Murphy & Presser, P.C.; Robert E. Straight, Esq.

(57) ABSTRACT

A method, system and article of manufacture are disclosed for quiescing multiplexed client messaging conversations. The invention uses plural independent mutexes to stop the application sends from both ends of a client/server channel, while allowing unsolicited control flows from the server to client to also be handled and quiesced. Once the channel is quiesced a channel-wide renegotiation, such as SSL secret key reset, can flow. The channel can then restart, again with the possibility of unsolicited server to client flows. The preferred embodiment of the invention provides a number of important advantages. For example, this embodiment allows channel-wide negotiation flows to occur on a multiplexed channel without the need to wait for application conversations to complete. It also allows channel-wide negotiation flows to occur on a multiplexed channel on which unsolicited server to client flows can occur.

20 Claims, 4 Drawing Sheets

FLEXIBLE PROCEDURE FOR QUIESCING MULTIPLEXED CLIENT

CROSS REFERENCE TO RELATED APPLICATIONS

The present application is related to concurrently filed U.S. patent applications Ser. No. 12/248,069 for "Efficient Selection of A Messaging Multiplexed Channel Instance" and Ser. No. 12/248,087 for "Configuration For Messaging Multiplexed Channel Instances With Varying Connection Speeds," the disclosure of which are herein incorporated by reference in their entireties as if set forth fully herein.

BACKGROUND OF THE INVENTION

1. Field of the Invention

This invention generally relates to multiplexed client messaging conversations, and more specifically, the invention relates to a method and system for quiescing multiplexed client messaging conversations.

2. Background Art

In many state of the art computer systems, a single communication channel can handle communications in both directions between a client and a server, and, in fact, one channel can handle communications in both directions between plural or multiple clients and a server. Communicating two or more conversations over a single channel socket, referred to as multiplexing, allows many applications connections to proceed while limiting the resources they use and the connection time they may require. Typically, a number of features apply to the entire channel/socket and are established at channel/socket startup. Subsequent application connections with these features can connect across the same channel/socket without the need to re-establish the features for themselves. A typical example is the TLS/SSL security features of a channel/socket, which are often expensive to establish, but can be shared without re-establishing them by subsequent connections with the same TLS/SSL profile.

The most simple and efficient multiplexing scenario would be: channel/socket-wide set-up and negotiation is conducted at start-up; all the conversations start, run and complete; and the channel/socket is taken down.

However, certain channel-wide events have to be processed while the channel is active with many conversations. A particularly important example of this is TLS/SSL secret key reset; the private key established at channel start-up is recalculated periodically while the channel runs to prevent the key from becoming compromised. In order to achieve this a potentially large number of multiplexed conversations must be temporarily stopped before the secret key reset can flow, and then these conversations must all restart.

Existing solutions for processing these channel-wide events include (1) to wait for existing conversations to complete, and (2) single global "stop send" mutexes. These two solutions are discussed below.

Wait for Existing Conversations to Complete

One simple solution allowing mid-run channel renegotiation would be: (a) detect that renegotiation is needed; (b) block attempts to start new conversations; (c) wait for the existing conversations to complete; (d) renegotiate; and (e) allow new conversations to start again. For some applications, for instance interactive ones with short running connections, this could be a workable strategy. But with a messaging infrastructure, the conversations can be very long-running and the channel renegotiation would be unacceptably delayed if it could only happen when all the conversations had ended.

Single Global "Stop Send" Mutexes

A more flexible solution allows the channel renegotiation to occur while individual conversations are still active. A global send mutex is maintained on each side of the channel to serialize sends to the communications protocol from different threads. On the side of the channel, which first detects the need for renegotiation, this mutex is set for the duration of the renegotiation. A flow is made to the other end of the channel to indicate that we have stopped sending and that it should too. That other end of the channel also sets its send mutex for the duration of the renegotiation. The renegotiation, which is normally initiated by the client end of the channel, can then take place (at a lower layer of code which does not need send mutexes as it will operate in half-duplex mode). Once the client is satisfied that this has completed, it enables the higher-layer sends again, and sends an indication to the server that it should do the same.

In order to implement a multiplexed system, a thread is needed for receiving data at both ends of the channel at all times. This thread will sometimes be responsible for sending data too, if a relatively simple response is required, and so is controlled by the sending mutex. But it is also required to receive the data for the channel renegotiation. As neither receive thread can be allowed to send data while the channel is quiescing, the threads are subject to the global "send data" mutex. But if either receive thread gets suspended on this mutex, the channel renegotiation will fail, as its flows will not be received, and the channel will hang.

In spite of this, the global send mutex solution can be redesigned to work as described as long as certain, not unreasonable, limitations are imposed on the flows which can be received.

In general, the application connections on the client will each have their own threads, which will send application data. The receive thread on the client passes the responses to the application requests back to the application threads as soon as they are received and is not responsible for sending anything back in response to them. On the other hand, the receive thread on the server will often process short requests from the client applications and will itself send the responses back. So, quiesce flows are configured so that the active quiescing is always initiated from the client; if the server detects the need for a renegotiation it just tells the client to go into active quiescing mode; the server does not stop its sending until subsequently when the client has told it to.

The client sets its global send mutex as soon as it has become aware, either from its own processing or via a flow from the server, that channel renegotiation is required; the application threads suspend as they try to send, but the receive thread never does, as it never sends anything. The client now tells the server to quiesce itself. Assuming the client's flows are received in order at the server, when the server gets the request to quiesce, it can be sure that no other flows will be received on the receive thread (which might have triggered a send from the receive thread and hence a deadlock) and so the server can safely set its global send mutex. The renegotiation and restarting of sends can then occur straightforwardly.

While such a system is workable, it relies on the restriction that the client receive thread can never send data. In a more sophisticated system, this limitation can be undesirable. For instance, bidirectional heartbeats (i.e. heartbeats initiated independently by both the server and the client) can be used to improve reliability and performance (see, for example, Cisco WAN Manager Peer-to-Peer Communication: http://www.cisco.com/univercd/cc/td/doc/product/wanbu/svplus/15/ug/app3.htm). A server-initiated heartbeat flow is not connected with a particular application thread and should be responded to immediately from the client receive thread. Once this, or similar, flows are allowed, using the single global "stop send" mutexes approach leads to the possibility of a client receive thread deadlock in the window between when the client has stopped its sends and indicated this to the server, and when the server receives this flow.

SUMMARY OF THE INVENTION

An object of this invention is to provide a procedure for quiescing multiplexed client messaging conversations.

Another object of the present invention is to allow channel-wide negotiation flows to occur on a multiplexed channel without the need to wait for application conversations to complete.

A further object of the invention is to allow channel-wide negotiation flows to occur on a multiplexed channel on which unsolicited server to client flows can occur.

An object of the present invention is to provide a method and system using dual independent mutexes to stop the application sends from both ends of a client/server channel, while allowing unsolicited control flows from the server to client to also be handled and quiesced.

These and other objectives are attained with a method, system and article of manufacture for quiescing multiplexed client messaging conversations. The invention uses plural independent mutexes to stop the application sends from both ends of a client/server channel, while allowing unsolicited control flows from the server to client to also be handled and quiesced. Once the channel is quiesced a channel-wide renegotiation, such as SSL secret key reset, can flow. The channel can then restart, again with the possibility of unsolicited server to client flows.

The multiplexed client messaging system of the preferred embodiment of the invention has the following characteristics: a single receive thread on the server and client; and on the client, separate threads for each application connection/conversation. On the client the receive thread responds to control flows itself, and passes responses to application requests back to the waiting application threads. The server receive thread can handle application requests and respond to them without switching threads. The client initiates renegotiation flows. Sends from different threads must be serialized over the communications protocol. The server end of the connection can send unsolicited control flows at any time; the client receives thread responds to these directly.

The preferred embodiment of the invention provides a number of important advantages. For example, this embodiment allows channel-wide negotiation flows to occur on a multiplexed channel without the need to wait for application conversations to complete.

It also allows channel-wide negotiation flows to occur on a multiplexed channel on which unsolicited server to client flows can occur.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
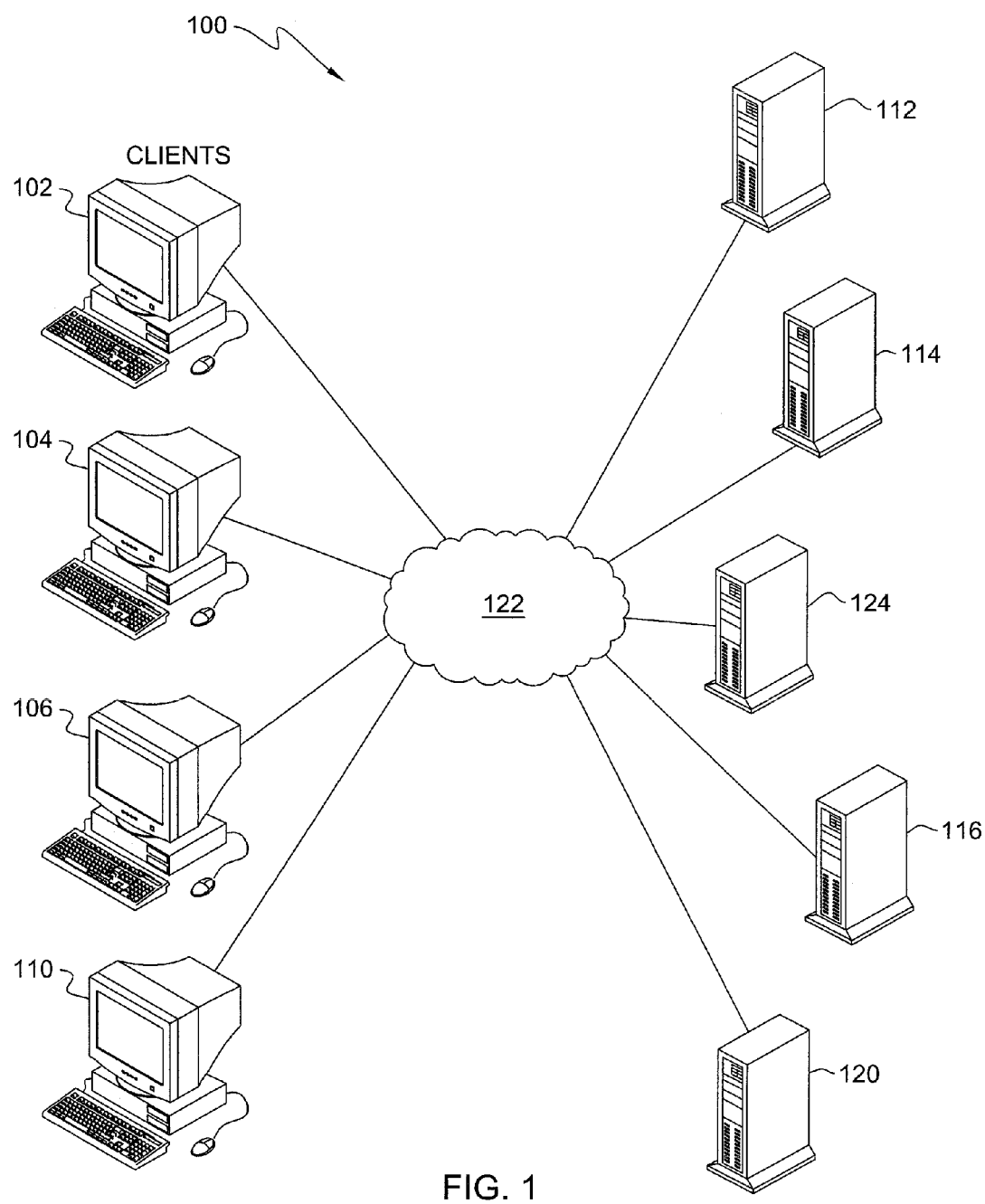
FIG. 1 illustrates a distributed computing environment in which the present invention may be practiced.

The present invention can be practiced in a variety of specific computing environments; and, for example, FIG. 1 shows a distributed computing system 100 in which the invention may be carried out. System 100 includes clients 102, 104, 106 and 110, and servers 112, 114, 116 and 120. The clients communicate over network 122 with a distributing processor 124 that performs workload management and distributes communications for connection to the servers. The distributing processor 124 may also function as a server and, thus, may be the endpoint of communications with the clients.

In operation, when the distributing processor 124 receives communications requests from the clients, the distributing processor routes those communications to appropriate ones of the servers, and establishes communications channels between the clients and the servers. These communication channels need not go through the distributing processor. Each of these channels preferably can carry communications in both directions between a client and a server and can also carry communications between plural or multiple clients and a server.

Application connections from a messaging client may be multiplexed over a single communications channel. Multiplexing several conversations over a single channel/socket allows many application connections to proceed while limiting the resources they use and the connection time they may require. Typically, a number of features apply to the entire channel/socket and are established at channel/socket startup. Subsequent application connections with these features can connect across the same channel/socket without the need to re-establish the features for themselves. A typical example is the TLS/SSL security features of a channel/socket, which are often expensive to establish, but can be shared without re-establishing them by subsequent connections with the same TLS/SSL profile.

The most simple and efficient multiplexing scenario would be: channel/socket-wide set-up and negotiation is conducted at start-up; all the conversations start, run and complete; and the channel/socket is taken down.

However, certain channel-wide events have to be processed while the channel is active with many conversations. A particularly important example of this is TLS/SSL secret key reset; the private key established at channel start-up is recalculated periodically while the channel runs to prevent the key from becoming compromised. In order to achieve this a potentially large number of multiplexed conversations must be temporarily stopped before the secret key reset can flow, and then these conversations must all restart.

The present invention provides an improved solution for quiescing multiplexed client messaging conversations. The preferred embodiment of the invention makes use of three mutexes, which prevent certain components of the system from sending data when the mutexes are set. These mutexes are referred to herein as the Client Application Thread Send Mutex, the Client Receive Thread Send Mutex, and the Server Send Mutex. Client Application Thread Send Mutex is set, no application threads on the client can send data, but the receive thread on the client can. If the Client Receive Thread Send Mutex is set, the receive thread on the client cannot send data, but the application threads on the client can. On a client that is not quiescing, both the above mutexes are held before data is sent to ensure the sends are serialized. If the Server Send Mutex is set, no threads on the server can send data.

As a specific example, the present invention addresses the situation where an application thread on a client is about to send data and a decision is made that the channel needs to be quiesced so that a channel-wide value can be renegotiated. In these circumstances, the client application thread sets the Client Application Thread Send Mutex and the Client Receive Thread Send Mutex. A "pause data sends" control flow is sent from the application thread, instead of the data it has to send, to indicate to the server end of the channel that we are quiescing. The application thread then clears just the Client Receive Thread Send Mutex it set previously.

This allows the receive thread only to send again. This is now safe as nothing will interfere with any receive thread sends, as we will not send again from any application threads until the channel renegotiation is complete. It is necessary as otherwise the receive thread may have received, or may now receive, a control flow it needs to respond to from the server before the "pause data sends" control flow is received by the server; if we left the Client Receive Thread Send Mutex set, the receive thread would hang when trying to respond and the channel instance would therefore hang. Note that application responses are passed back to the application threads by the receive thread and are not responded to directly by it. The application thread that was about to send data but that instead triggered the channel quiesce and renegotiation, now waits on an event semaphore until the renegotiation flows are complete.

The server-side receive thread receives the "pause data sends" control flow and raises its Server Send Mutex to stop all sever-initiated sends on the channel/socket. As the server has received the "pause data sends" control flow from the client, it must have processed all previous client flows and will not get any more except for possibly control flow responses from the client receive thread. As these will not give rise to a server receive thread send, we can block its receive thread sends.

The server end then sends a "data sends paused" control flow. The server expects data to flow back to it as a result of the "data sends paused" control flow within the heartbeat interval, and we do not want to heartbeat at the same time as the renegotiation flows are happening, as they must have the socket to themselves. So, if it is about to time-out, the server tests whether renegotiation is in progress: if we time-out in this state, we close the channel rather than heartbeating. The client similarly suppresses heartbeating during the renegotiation flows.

When the client receives the "data sends paused" control flow, it starts the renegotiation flows from the receive thread. As these are half-duplex, they cannot interfere with one another and do not require use of a send mutex. Once these have completed, the client sends a "data sends resumed" control flow to the server. This is sent before the client sends any application data, otherwise the server receive thread will hang waiting to send the response, as the Server Send Mutex will still be set. When the "data sends resumed" control flow is received on the server, its Server Send Mutex is cleared.

The client receive thread posts the event semaphore for the application that was about to send data but instead triggered the channel quiesce and renegotiation. The client application thread sets the Client Receive Thread Send Mutex again so that there is no danger of a receive thread send arising to interfere with the actual data send. The client application thread then sends the data. When this is done it clears both the Client Receive Thread Send Mutex and the Client Application Thread Send Mutex and leaves send.

Figure 2:
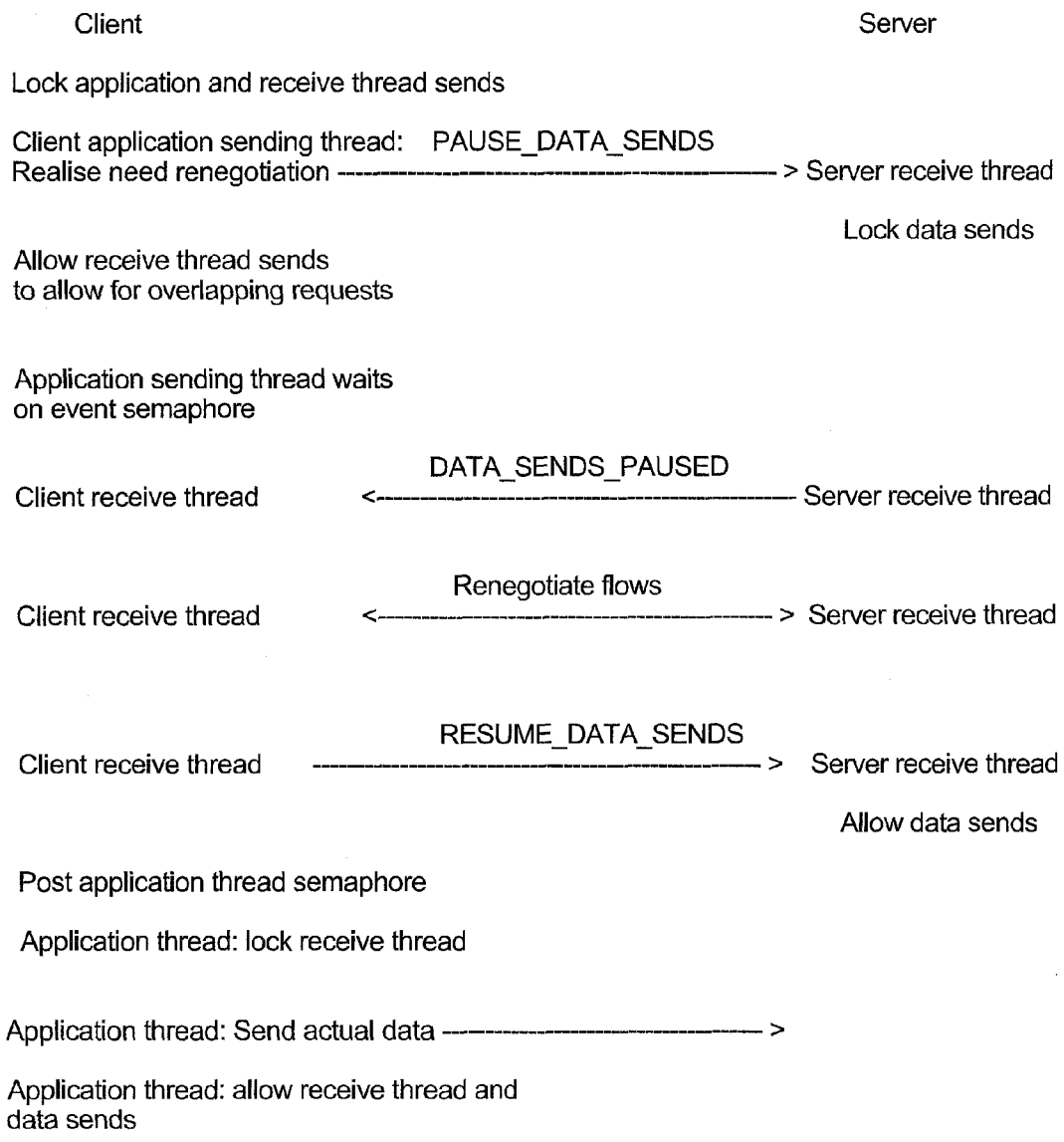
FIG. 2 shows a preferred algorithm for implementing this invention.

FIG. 2 diagrammatically illustrates the above-discussed sequence on a client-initiated multiplexed channel renegotiation. Also, as indicated in FIG. 2, if the server is the first to notice that a renegotiation is required, the server tells the client, and then the same set of flows then occurs.

Figure 3:
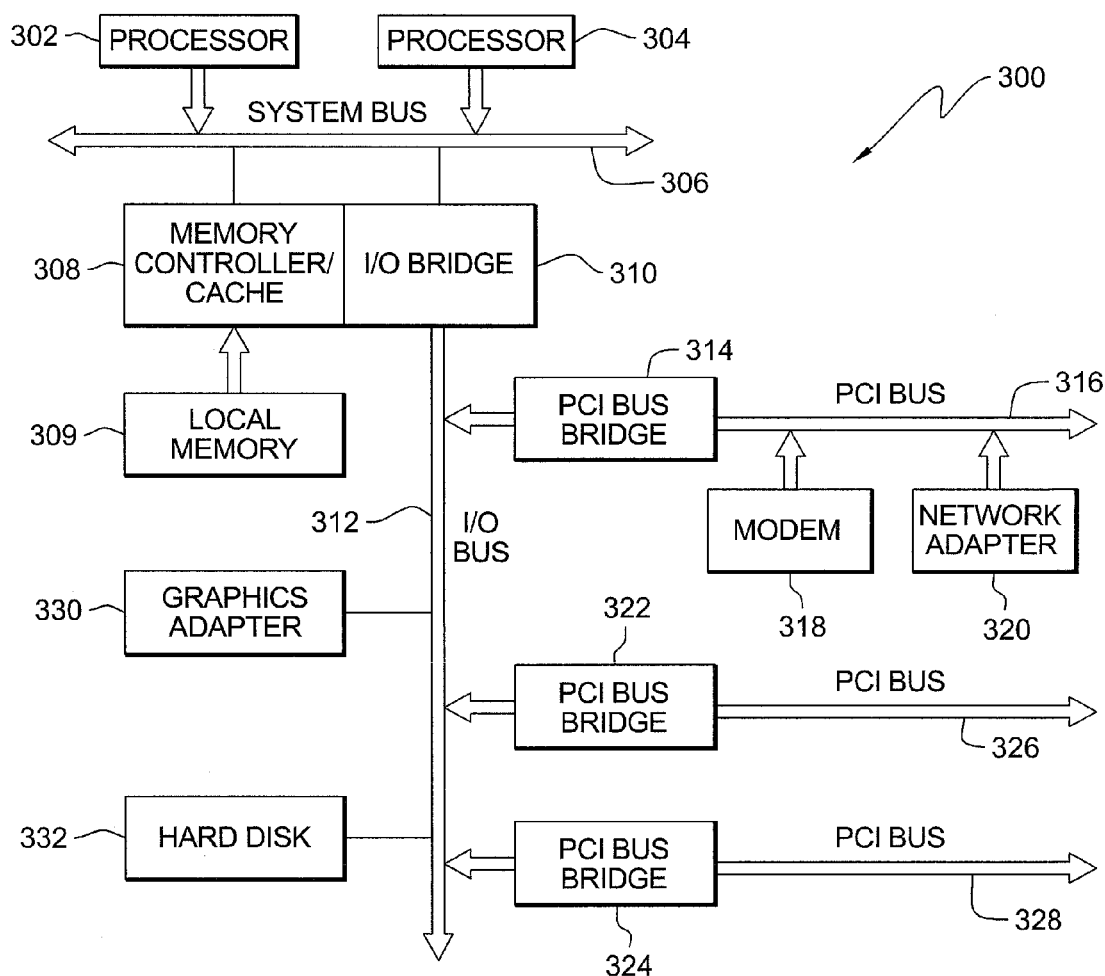
FIG. 3 is a block diagram illustrating a data processing system that may be implemented as a server in the environment of FIG. 1.

Referring to FIG. 3, a block diagram depicts a data processing system that may be implemented as a server, such as server 104 in FIG. 1, in accordance with the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 316 connected to I/O bus 312 provides an interface to PCI local bus 316. A number of modems 318-320 may be connected to PCI bus 316. Typical PCI bus implementations support four PCI expansion slots or add-in connectors. Communications links to network computers in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition or in place of the hardware depicted. The depicted example is not meant to imply architectural limitations with respect to the present invention.

The data processing system depicted in FIG. 3 may be, for example, an IBM RISC/System 6000, a product of International Business Machines Corporation in Armonk, N.Y., running the Advanced Interactive Executive (AIX) operating system.

Figure 4:
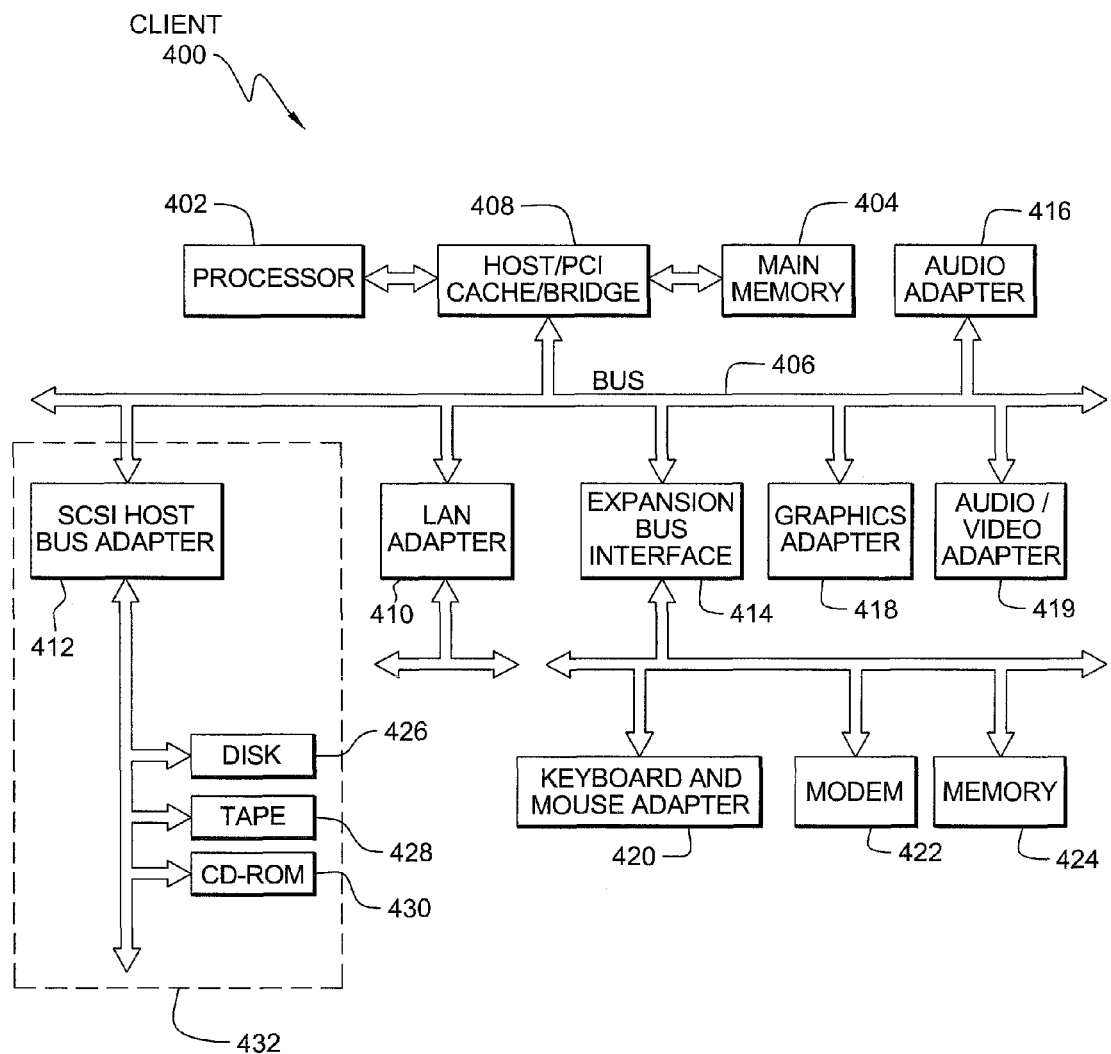
FIG. 4 is a block diagram depicting a data processing system that may be implemented as a client in the environment of FIG. 1.

With reference now to FIG. 4, a block diagram illustrates a data processing system that may be implemented as a client, such as client 108 in FIG. 1, in accordance with the present invention. Data processing system 400 is an example of a client computer. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 also may include an integrated memory controller and cache memory for processor 402.

Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 304 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430, as noted by dotted line 432 in FIG. 4, denoting optional inclusion. In that case, the computer, to be properly called a client computer, must include some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device which is configured with ROM and/or flash ROM in order to provide non-volatile memory for storing operating system files and/or user-generated data.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled n the art, and it is intended that the appended claims cover all such modifications and embodiments as fall within the true spirit and scope of the present invention.

What is claimed is:

1. A method of quiescing multiplexed client messaging conversations between at least one application on a client computer and a server computer, said conversations occurring over a communications channel having a server end and a client end, the method comprising the steps of:
    using a plurality of independent mutexes to stop application sends from both ends of the channel, including setting a client side mutex to stop sends over the channel from the application to the server end of the channel, and setting a server side mutex to stop sends over the channel from the server end of the channel to the application;
    after setting the client side mutex and the server side mutex, allowing unsolicited control flows from the server computer over the channel to the client computer to be handled and completed to end said control flows over the channel and to quiesce the channel; and
    once the channel is quiesced, renegotiating a channel-wide event by conducting negotiation flows on the channel.

2. A method according to claim 1, wherein one or more application threads are used to send data to the channel from said at least one application, and wherein the using step includes the step of setting a client application thread send mutex to prevent the application threads from sending data to the channel.

3. A method according to claim 2, wherein the client includes a receive thread for receiving data sent to the client over the channel, and wherein the client application thread send mutex, when set, allows said receive thread to receive data.

4. A method according to claim 1, wherein a receive thread on the client is used to receive and to send data over the channel, and one or more application threads are used to send data to the channel from said at least one application, and wherein the using step includes the step of setting a client receive thread send mutex to prevent the receive thread from sending data over the channel.

5. A method according to claim 4, wherein one or more application threads are used to send data to the channel from said at least one application, and wherein the client receive thread send mutex, when set, allows said application threads to send data over the channel.

6. A method according to claim 5, wherein the using step includes the step of:
    the client clearing the receive thread send mutex; and
    the renegotiating step includes the steps of:
    when the renegotiation is complete, sending a message to the application thread indicating that said renegotiation is complete; and
    said application thread, in response to receiving said message, resetting the client receive thread send mutex, sending data to the server end of the channel, and then clearing the client receive thread send mutex.

7. A method according to claim 1, wherein the server computer includes a receive thread for receiving and sending data over the channel, and wherein the using step includes the step of setting a server send mutex to prevent the receive thread from sending data over the channel.

8. A method according to claim 1, wherein an application thread is used to send data to the channel from said at least one application, and wherein the using step includes the steps of:
setting a client application thread send mutex to prevent the application threads on the client from sending data to the server; and
sending a pause data sends control flow from the application thread to the server end of the channel to indicate that the channel is quiescing.

9. A method according to claim 8 wherein the using step includes the further step of, after the sending step, the application thread clearing the client receive thread send mutex.

10. A method according to claim 9, wherein a server side receive thread is located on the server end of the channel for receiving and sending data over the channel, and wherein, when the server side receive thread receives the pause data sends control flow, setting a server send mutex to stop all sever-initiated sends on the channel.

11. A system for quiescing multiplexed client messaging conversations between at least one application on a client computer and a server computer, said conversations occurring over a communications channel having a server end and a client end, the system comprising at least one processor unit configured for:
using a plurality of independent mutexes to stop application sends from both ends of the channel including setting a client side mutex to stop sends over the channel from the application to the server end of the channel, and setting a server mutex to stop sends over the channel from the server end of the channel at the application;
after setting the client side mutex and the server side mutex, allowing unsolicited control flows from the server computer over the channel to the client computer to be handled and completed to end said control flows over the channel and to quiesce the channel; and
once the channel is quiesced, renegotiating a channel-wide event by conducting negotiation flows on the channel.

12. A system according to claim 11, wherein one or more application threads are used to send data to the channel from said at least one application, and wherein the at least one processor unit is configured for setting a client application thread send mutex to prevent the application threads from sending data to the channel.

13. A system according to claim 12, wherein the client includes a receive thread for receiving data sent to the client over the channel, and wherein the client application thread send mutex, when set, allows said receive thread to receive data.

14. A system according to claim 11, wherein a receive thread on the client is used to receive and to send data over the channel, and one or more application threads are used to send data to the channel from said at least one application, and wherein the processor unit is configured for setting a client receive thread send mutex to prevent the receive thread from sending data over the channel.

15. A system according to claim 14, wherein one or more application threads are used to send data to the channel from said at least one application, and wherein the client receive thread send mutex, when set, allows said application threads to send data over the channel.

16. An article of manufacture comprising
at least one computer usable medium having computer readable program code logic to execute a machine instruction in a processing unit for quiescing multiplexed client messaging conversations between at least one application on a client computer and a server computer, said conversations occurring over a communications channel having a server end and a client end, the computer readable program code logic, when executing, performing the following steps:
using a plurality of independent mutexes to stop application sends from both ends of the channel, including setting a client side mutex to stop sends over the channel from the application to the server end of the channel, and setting a server side mutex to stop sends over the channel from the server end of the channel to the application;
after setting the client side mutex and the server side mutex, allowing unsolicited control flows from the server computer to the client computer over the channel to be handled and completed to end said control flows over the channel and to quiesce the channel; and
once the channel is quiesced, renegotiating a channel-wide event by conducting negotiation flows on the channel.

17. An article of manufacture according to claim 16, wherein the server computer includes a receive thread for receiving and sending data over the channel, and wherein the using step includes the step of setting a server send mutex to prevent the receive thread from sending data over the channel.

18. An article of manufacture according to claim 16, wherein an application thread is used to send data to the channel from said at least one application, and wherein the using step includes the steps of:
setting a client application thread send mutex to prevent the application threads on the client from sending data to the server; and
sending a pause data sends control flow from the application thread to the server end of the channel to indicate that the channel is quiescing.

19. An article of manufacture according to claim 18 wherein the using step includes the further step of, after the sending step, the application thread clearing the client receive thread send mutex.

20. An article of manufacture according to claim 19, wherein a server side receive thread is located on the server end of the channel for receiving and sending data over the channel, and wherein, when the server side receive thread receives the pause data sends control flow, setting a server send mutex to stop all sever-initiated sends on the channel.

* * * * *